(12) United States Patent
Wang et al.

(10) Patent No.: US 11,044,295 B2
(45) Date of Patent: Jun. 22, 2021

(54) DATA PROCESSING METHOD, APPARATUS AND ELECTRONIC DEVICE

(71) Applicant: Beijing SenseTime Technology Development Co., Ltd., Beijing (CN)

(72) Inventors: Lei Wang, Beijing (CN); Fan Yang, Beijing (CN); Qing Luan, Beijing (CN); Lin Sun, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 117 days.

(21) Appl. No.: 15/845,743

(22) Filed: Dec. 18, 2017

(65) Prior Publication Data
US 2018/0146024 A1  May 24, 2018
US 2019/0182306 A9  Jun. 13, 2019

Related U.S. Application Data

(63) Continuation of application No. PCT/CN2017/098028, filed on Aug. 18, 2017.

(30) Foreign Application Priority Data

Aug. 19, 2016  (CN) .......................... 201610694696.1

(51) Int. Cl.
*H04L 29/06* (2006.01)
*H04N 21/426* (2011.01)
*H04N 21/438* (2011.01)

(52) U.S. Cl.
CPC ........ *H04L 65/607* (2013.01); *H04L 65/4069* (2013.01); *H04N 21/42653* (2013.01); *H04N 21/438* (2013.01)

(58) Field of Classification Search
CPC .............. H04L 65/607; H04L 65/4069; H04N 21/2653; H04N 21/438
See application file for complete search history.

(56) References Cited

U.S. PATENT DOCUMENTS

| 6,292,226 | B1  | 9/2001 | Yamanaka et al. |
| 7,796,155 | B1* | 9/2010 | Neely, III .......... G06K 9/00771 345/418 |
| 8,957,915 | B1* | 2/2015 | Chalasani ............ G11B 27/031 345/629 |
| 9,298,884 | B1* | 3/2016 | Ahmad ............... G06F 19/3418 |
| 9,420,353 | B1  | 8/2016 | Gargi et al. |
| 9,583,140 | B1* | 2/2017 | Rady .................... G11B 27/031 |

(Continued)

FOREIGN PATENT DOCUMENTS

| CN | 101150537 A | 3/2008 |
| CN | 102075727 A | 5/2011 |
| CN | 104010215 A | 8/2014 |

*Primary Examiner* — Azizul Choudhury
(74) *Attorney, Agent, or Firm* — Blank Rome LLP

(57) ABSTRACT

The embodiments of the present disclosure disclose a data processing method, apparatus and electronic device, the method including: acquiring material attribute information of a first material in a video image played on a first device terminal, wherein the video image includes a raw video image and the first material drawn on the raw video image using computer graphics; generating a transmission stream according to the raw video image and the material attribute information; and sending the transmission stream to at least one second device terminal.

20 Claims, 4 Drawing Sheets

(56) References Cited

U.S. PATENT DOCUMENTS

| | | | |
|---|---|---|---|
| 2007/0285405 A1* | 12/2007 | Rehm | G06F 1/1616 |
| | | | 345/173 |
| 2008/0240490 A1* | 10/2008 | Finkelstein | H04N 21/235 |
| | | | 382/100 |
| 2012/0081516 A1 | 4/2012 | Tsukagoshi | |
| 2013/0222538 A1 | 8/2013 | Chen et al. | |
| 2013/0343727 A1* | 12/2013 | Rav-Acha | G11B 27/031 |
| | | | 386/282 |
| 2014/0301719 A1* | 10/2014 | Pearlstein | G06F 12/0875 |
| | | | 386/326 |
| 2015/0117550 A1* | 4/2015 | Narasimhan | H04N 21/23605 |
| | | | 375/240.26 |
| 2016/0212455 A1* | 7/2016 | Manna | G06Q 30/02 |
| 2016/0277781 A1* | 9/2016 | Lennon | H04N 21/2743 |
| 2017/0053455 A1* | 2/2017 | Chen | G06T 19/20 |
| 2018/0249200 A1 | 8/2018 | Wang et al. | |

* cited by examiner

DATA PROCESSING METHOD, APPARATUS AND ELECTRONIC DEVICE

CROSS-REFERENCE TO RELATED APPLICATIONS

This application is a continuation of PCT/CN2017/098028, filed on Aug. 18, 2017, which claims priority to Chinese Application No. 201610694696.1, filed on Aug. 19, 2016 and entitled "Data Processing Method, Apparatus and Terminal Device," the entire disclosures of which are hereby incorporated by reference.

TECHNICAL FIELD

The present disclosure relates to the technical field of data processing, in particular to a data processing method, apparatus and electronic device.

BACKGROUND

With the development of Internet technology, live broadcast becomes more and more popular among the public. A host attracts audiences with rich performance, diverse stage props and a variety of information so as to meet diverse needs of the audiences for video playback.

As the live broadcast process becomes more and more diverse and complex, a host may realize the normal operation of the live broadcast by using an electronic device with a comparatively premium configuration. In the event that the electronic device configuration of the user watching the live broadcast is lower than that on a host terminal, it is possible that the ideal watching effect cannot be achieved due to the failure to effectively process live broadcast information and data.

SUMMARY

The embodiments of the present disclosure provide a technical solution for data processing.

In a first aspect, the embodiment of the present disclosure provides a data processing method, comprising: acquiring material attribute information of a first material in a video image played on a first device terminal, wherein the video image comprises a raw video image and the first material drawn on the raw video image using computer graphics; generating a transmission stream according to the raw video image and the material attribute information; and sending the transmission stream to at least one second device terminal.

In a second aspect, the embodiment of the present disclosure provides a data processing apparatus, comprising: an extracting module, configured for acquiring material attribute information of a first material in a video image played on a first device terminal, wherein the video image comprises a raw video image and the first material drawn on the raw video image using computer graphics; a generating module, configured for generating a transmission stream according to the raw video image and the material attribute information; and a sending module, configured for sending the transmission stream to at least one second device terminal.

In a third aspect, the embodiment of the present disclosure provides an electronic device, comprising a processor, a memory, a communication interface and a communication bus; the processor, the memory and the communication interface communicate with each other through the communication bus; and the memory is configured for storing at least one executable instruction that causes the processor to perform the data processing method above.

In a fourth aspect, the embodiment of the present disclosure provides a computer-readable storage medium storing the following: an executable instruction for acquiring material attribute information of a first material in a video image played on a first device, wherein the video image comprises a raw video image and the first material drawn on the raw video image using computer graphics; an executable instruction for generating a transmission stream according to the raw video image and the material attribute information; and an executable instruction for sending the transmission stream to at least one second device terminal.

According to the embodiments of the present disclosure, a transmission stream sent from one terminal carries material attribute information of a first material, thus enabling a second terminal, while displaying the transmission stream, to determine the first material in a video image played on the terminal sending the transmission stream according to the material attribute information so as to perform corresponding processing and drawing to play the video image, thereby effectively reducing the video image display pressure on the second terminal.

In a fifth aspect, the embodiment of the present disclosure provides a data processing method, comprising: receiving a transmission stream, the transmission stream comprising a raw video image and material attribute information; determining a second material that matches the material attribute information in the transmission stream; and drawing the second material on the raw video image according to the material attribute information using computer graphics.

In a sixth aspect, the embodiment of the present disclosure also provides a data processing apparatus, comprising: a receiving module, configured for receiving a transmission stream, the transmission stream comprising a raw video image and material attribute information; a determining module, configured for determining a second material that matches the material attribute information in the transmission stream; and a drawing module, configured for drawing the second material on the raw video image according to the material attribute information using computer graphics.

In a seventh aspect, the embodiment of the present disclosure provides an electronic device, comprising a processor, a memory, a communication interface and a communication bus; the processor, the memory and the communication interface communicate with each other through the communication bus; and the memory is configured for storing at least one executable instruction that causes the processor to perform the data processing method above.

In an eighth aspect, the embodiment of the present disclosure provides a computer readable storage medium storing the following: an executable instruction for receiving a transmission stream, the transmission stream comprising a raw video image and material attribute information; an executable instruction for determining a second material that matches the material attribute information in the transmission stream; and an executable instruction for drawing the second material on the raw video image according to the material attribute information using computer graphics.

In a ninth aspect, the embodiment of the present disclosure provides a computer program, comprising a computer readable code; when the computer readable code runs in a device, a processor in the device executes executable instructions for implementing steps in a data processing method.

According to the embodiments of the present disclosure, a material can be quickly drawn according to material attribute information without the need of complicated algorithm analysis, thereby reducing the data processing burden on one hand, and on the other hand, is conducive to reducing the requirements for a terminal configuration because of the absence of need for an operation algorithm, realizing smooth watching of a live video and enhancing the user experience.

The technical solution of the present disclosure will be described in detail with reference to the accompanying drawings and embodiments.

BRIEF DESCRIPTION OF THE DRAWINGS

Accompanying drawings forming a part of the specification describe the embodiments of the present disclosure and together with the description, are used for explaining the principle of the present disclosure.

The present disclosure may be understood more clearly with reference to the accompanying drawings according to the detailed descriptions below.

DETAILED DESCRIPTION OF EMBODIMENTS

Figure 1:
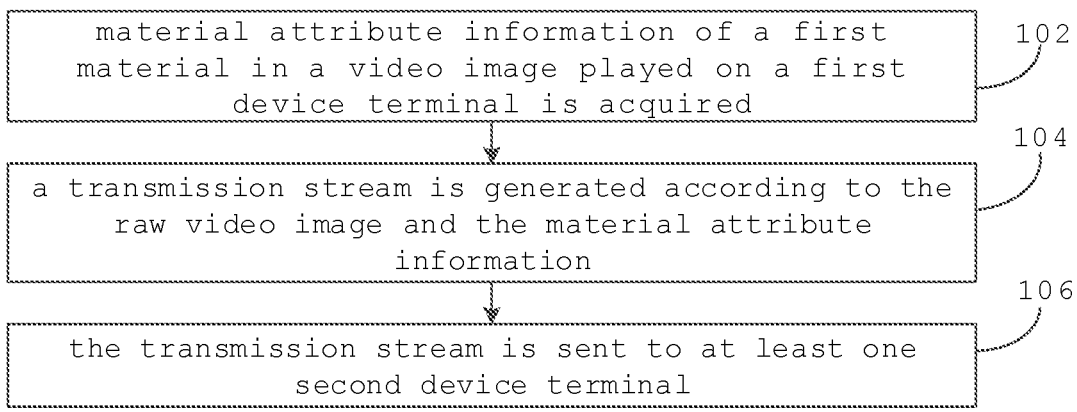
FIG. 1 is a step flowchart of a data processing method according to the present disclosure.

Various exemplary embodiments of the present disclosure will now be described in detail with reference to the accompanying drawings. It should be noted that, unless otherwise specifically stated, the relative arrangement, numerical expressions and numerical values of the components and steps set forth in these embodiments do not limit the scope of the present disclosure. At the same time, it should be understood that, for ease of description, dimensions of the respective parts shown in the accompanying drawings are not drawn in accordance with actual proportions. The following description about at least one exemplary embodiment is merely illustrative, and in no way intended to be a limitation to the present disclosure and the application or use thereof.

Techniques, methods and devices known to those skilled in the relevant art may not be discussed in detail, but where appropriate, such techniques, methods, and devices should be considered as part of the specification. It should be noted that similar labels and letters denote similar items in the following accompanying drawings. Therefore, once an item is defined in an accompanying drawing, it does not need to be further discussed in the subsequent accompanying drawings.

The embodiments of the present disclosure may be applied to an electronic device such as a terminal device, a computer system and a server, and such an electronic device may be operated together with a number of other general purpose or special purpose computing system environments or configurations. Examples of a well-known terminal device, a computing system, an environment and/or configuration suitable for use together with the electronic device such as a terminal device, a computer system and a server include, but not limited to, a personal computer system, a server computer system, a thin client, a thick client, a handheld or laptop device, a microprocessor-based system, a set top box, a programmable consumer electronics, a network personal computer, a small computer system, a large computer system and distributed cloud computing technology environment including any of the systems mentioned above.

An electronic device such as a terminal device, a computer system and a server may be described in general context of a computer system executable instruction (such as a program module) executed by a computer system. In general, a program module may include a routine, a program, a target program, a component, a logic, a data structure and the like, which performs a specific task or implements a specific type of abstract data. The computer system/server may be implemented in a distributed cloud computing environment in which a task is executed by a remote processing device that is linked through a communication network. In the distributed cloud computing environment, a program module may reside on a local or remote computing system storage medium including a storage device.

The technical solution of data processing provided by the present disclosure will be described below with reference to FIG. 1 to FIG. 11.

The following embodiments are intended to illustrate the present disclosure, but are not intended to limit the scope of the present disclosure. It should be understood by those skilled in the art that terms such as "first" and "second" in the present disclosure are used only to distinguish different steps, devices or modules, and represent neither any particular technical meaning nor any necessary logical order therebetween.

FIG. 1 is a step flowchart of a data processing method according to an embodiment of the present disclosure.

The data processing method according to the embodiment of the present disclosure will be described below by taking a target user terminal (a first device terminal, such as a host terminal) where a host is located in a live broadcast scene as an example. It should be understood that the live broadcast scene is only an optional application scenario of an embodiment of the present disclosure, and the embodiment of the present disclosure may also be applied to other non-live application scenarios involving video transmission, which is not limited in the embodiments of the present disclosure.

As shown in FIG. 1, a data processing method according to the present embodiment specifically comprises the following steps.

Step 102: material attribute information of a first material in a video image played on a first device terminal is acquired.

In an alternative example, step 102 may be performed by a processor by calling a corresponding instruction stored in a memory, or performed by an extracting module 302 operated by the processor.

In an alternative example, a target user terminal (a first device terminal, such as a host terminal) may establish a video communication with one or more other user terminals through a corresponding application. After the video communication is established, the target user terminal may record a video of the behaviors, actions or background of a target user, and transmit the recorded video simultaneously to one or more other user terminals (a second device terminal, such as a terminal of an aficionado) through a set transmission protocol. For example, the target user terminal applies for its own room in a live broadcast application such as Huajiao or Douyu, and after the target user terminal starts a live broadcast, a user terminal entered the room establishes a video communication with the target user terminal.

In an alternative example, at the target user terminal, a target user may trigger a drawing instruction by clicking on a first material, and draw the first material in a raw video image of the target user terminal using computer graphics. The target user terminal (such as the user terminal where the host is located) may capture a behavior/action of a target user (such as a host) and background information of a live broadcast of the target user through an image acquisition device (such as a camera). Wherein, the video image played on the target user terminal includes a raw video image and a first material drawn on the raw video image using computer graphics. The raw video image includes, for example, a behavior/action of the target user and a background of a live broadcast of the target user. The first material may include, but not limited to, a business object, for example, a special effect containing semantic information.

In an alternative example, the material attribute information may include, but not limited to, identification information of the material, position information of the material and link information of the material. The material attribute information may be specifically an ID of a business object, position information of the business object, link information of the business object, etc. The business object may include, but not limited to, information relevant to an aspect such as advertisements, entertainments, weather forecasts, traffic forecasts, and pets.

Step 104: a transmission stream is generated according to the raw video image and the material attribute information.

In an alternative example, step 104 may be performed by a processor by calling a corresponding instruction stored in a memory, or performed by a generating module 304 operated by the processor.

In an alternative example, a corresponding raw video image is determined based on a video image currently played on a first device terminal, the raw video image is encoded in accordance with a set video encoding format, and a transmission stream is generated according to the encoded raw video image and the material attribute information of the first material.

Step 106: the transmission stream is sent to at least one second device terminal.

In an alternative example, step 106 may be performed by a processor by calling a corresponding instruction stored in a memory, or performed by a sending module 306 operated by the processor.

In an alternative example, the transmission stream is sent to at least one other user terminal according to a video communication relationship established between a target user terminal (a first device terminal) and a second user terminal (a second device terminal).

Wherein, the transmission stream for transmitting the raw video image and the material attribute information varies with a transmission protocol. In the embodiment of the present disclosure, the transmission stream shall carry the raw video image and the material attribute information regardless of the protocol that is used.

In an alternative example, the transmission stream may also carry video attribute information of the raw video image, and the video attribute information of the raw video image includes such as, for example, resolution information of the raw video image.

In the embodiment of the present disclosure, material attribute information of a first material in a video image currently played on a first device terminal is acquired, wherein the video image includes a raw video image and the first material drawn on the raw video image using computer graphics; a transmission stream is generated according to the raw video image and the material attribute information; and the transmission stream is sent to at least one second device terminal, where the transmission stream to be transmitted carries the material attribute information of the first material, thus enabling the other terminal to determine, while displaying the transmission stream, a first material in a video image according to the material attribute information, and further to perform corresponding processing and drawing, thereby effectively reducing the burden of the other terminal for displaying the video image.

Figure 2:
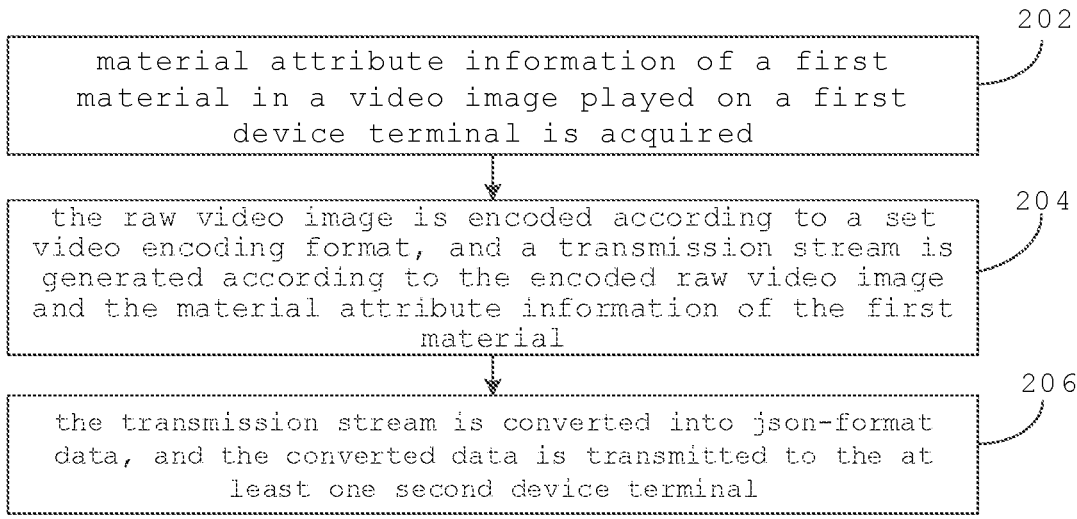
FIG. 2 is a step flowchart of a data processing method according to the present disclosure.

FIG. 2 is a flowchart of a method embodiment of the present disclosure. The data processing method according to the embodiment of the present disclosure will be described below with a target user terminal (a first device terminal) where a host is located in a live broadcast scene as an example. As shown in FIG. 2, the data processing method according to the present embodiment specifically includes the following steps.

Step 202: material attribute information of a first material in a video image played on a first device terminal is acquired.

In an alternative example, step 202 may be performed by a processor by calling a corresponding instruction stored in a memory, or performed by an extracting module 302 operated by the processor.

In an alternative example, a target user may display a material on a target user terminal, and the target user triggers a drawing instruction by clicking on a first material to draw the first material in a raw video image of the target user terminal using computer graphics.

Wherein the target user terminal and the other user terminal in the embodiment of the present disclosure are provided with the same material library, and the material libraries at both terminals may be synchronously updated by a back-end server, that is, the material libraries of the target user terminal and the other user terminal store the same material, wherein the optional means for determining a drawing position of the material may be as follows:

The material being a business object is introduced as an example. The business object, for example, may include but not limited to: a special effect containing semantic information (e.g., information such as information on advertisement, entertainment, weather forecast, traffic forecast and pet), wherein the special effect, for example, may be a three-dimensional (3D) effect, for example, a three-dimensional advertisement effect such as an advertisement that is presented in a form of 3D effect, or a two-dimensional (2D) sticker, for example, a two-dimensional advertisement sticker effect such as an advertisement that is presented in a form of sticker, or a particle effect. Not limited by the above, other forms of business objects are also applicable to the technical solution of the embodiment of the present disclosure, such as an application (APP) or textual description or presentation of the application, a certain object that interacts with a video viewer (such as an electronic pet).

Approach one: a feature point of a target user is determined from a raw video image, and according to the feature point of the target user, information about a drawing position of a business object to be drawn in the raw video image is determined by using a pre-trained convolution network model for determining a display position of the business object in the video image. Approach two: a type of a target user is determined from a raw video image, for example, a type of a target user is determined according to a feature point of the target user; and information about a drawing position of the business object to be drawn is determined according to the type of the target user. The drawing position of the business object is equivalent to the display position of the business object in the video image. The two approaches mentioned above will be described below in detail.

Approach One

While determining information about a drawing position of a business object to be drawn in a video image with the approach one, a convolution network model needs to be trained in advance, and the trained convolution network model has a function of determining a display position of a business object in a video image. Alternatively, a convolution network model that has been trained by a third party and has a function of determining a display position of the business object in the video image, may be directly used.

It should be noted that, in the present embodiment, description is focused on the training of the convolution network model for the business object, and the training of the convolution network model for the target user may be implemented by referring to related techniques and is only briefly described in the embodiment of the present disclosure.

When it is necessary to pre-train the convolution network model, a feasible training approach includes the following process.

(1) A feature vector of a business object sample image to be trained is acquired.

Here, the feature vector contains information of a target user in the business object sample image, as well as position information and/or confidence information of the business object. Here, the information of the target user indicates image information of the target user; the position information of the business object indicates a position of the business object, which may be the position information of a center point of the business object or the position information of the area where the business object is located. The confidence information of the business object indicates a probability that an effect (such as being watched or clicked or viewed) may be achieved when the business object is presented at the current position. The probability may be set according to a statistical analysis result of the historical data, a simulation experiment result or artificial experience. In a practical application, while the convolution network model is trained for the target user set, according to the actual needs, the convolution network model may be trained regarding the position information of the business object, or the convolution network model may be trained for the confidence information of the business object, or the convolution network model may be trained for both. The training of the convolution network model for both enables the trained convolution network model to determine the position information and confidence information of the business object more effectively and accurately, thus providing a basis for the presentation of the business object.

The business object in the business object sample image in the embodiment of the present disclosure may be pre-marked with the position information, confidence information or both of the position information and the confidence information. Naturally, such information may also be obtained through other means in practical application. By marking the business object with corresponding information in advance, data to be processed and a number of interactions may be effectively saved, and data processing efficiency may be improved.

The business object sample image having information of the target user as well as the position information and/or the confidence information of the business object is used as a training sample, and feature vector extraction is performed on the business object sample image to acquire a feature vector containing the information of the target user as well as the position information and/or the confidence information of the business object.

Here, the extraction of the feature vector may be implemented in a suitable approach in related art, which will not be described herein in the embodiment of the present disclosure.

(2) Convolution processing is performed on the feature vector to acquire a feature vector convolution result.

The acquired feature vector convolution result contains information about the target user and the position information and/or the confidence information of the business object.

A number of convolution processing performed on the vector feature may be set according to the actual needs. That is, a number of convolution layers in the convolution network model is set according to the actual needs, as long as a final feature vector convolution result satisfies a standard that an error is within a certain range (for example, $\frac{1}{20}$ to $\frac{1}{5}$ of the image length or width, and preferably, it may be $\frac{1}{10}$ of the image length or width). The convolution result is a result after feature extraction is performed on the feature vector, and the result may effectively represent characteristics and classification of each related object in the video image.

In the embodiment of the present disclosure, when the feature vector contains both the position information of the business object and the confidence information of the business object, that is, in the case where the convolution network model is trained for both the position information and the confidence information of the business object, the feature vector convolution result is shared when the convergence conditions are judged separately later without repeated processing and calculation, thus reducing resource consumption caused by the data processing, and improving data processing speed and data processing efficiency.

(3) Whether the information of the corresponding target user as well as the position information and/or the confidence information of the business object in the feature vector convolution result meet a convergence condition is determined individually.

Here, the convergence condition is properly set by those skilled in the art according to actual needs. When the information meets the convergence condition, it may be considered that parameters in the convolution network model are set appropriately. When the information cannot meet the convergence condition, it may be considered that a parameter in the convolution network model is not set appropriately, and needs to be adjusted. Such an adjustment is an iterative process until that the result of the convolution processing performed on the feature vector with the adjusted parameter meets the convergence condition.

In an alternative approach, the convergence condition may be set according to a preset standard position and/or a preset standard confidence. For example, whether a distance from a position indicated by the position information of the business object in the feature vector convolution result to the preset standard position meets a certain threshold is used as the convergence condition for the position information of the business object, and whether a difference between a confidence indicated by the confidence information of the business object in the feature vector convolution result and the preset standard confidence meets a certain threshold is used as the convergence condition for the confidence information of the business object.

Alternatively, the preset standard position may be an average position obtained by averaging the positions of the business objects in the business object sample images to be trained, and the preset standard confidence may be an average confidence obtained by averaging the confidences of the business objects in the business object sample images to be trained. The standard position and/or the standard confidence are set according to the positions and/or the confidences of the business objects in the business object sample images to be trained. Since the sample images are samples to be trained and have a large amount of data, the set standard position and standard confidence are more objective and more precise.

An alternative method for determining whether the position information and/or the confidence information of the corresponding business object in the feature vector convolution result meet the convergence condition comprises:

Acquiring position information of a corresponding business object in a feature vector convolution result; calculating a first distance between the position indicated by the position information of the corresponding business object and the preset standard position with a first loss function; and determining whether the position information of the corresponding business object meets the convergence condition according to the first distance;

Additionally or alternatively, acquiring confidence information of a corresponding business object in a feature vector convolution result; calculating a second distance between a confidence indicated by the confidence information of the corresponding business object and the preset standard confidence with a second loss function; and determining whether the confidence information of the corresponding business object meets the convergence condition according to the second distance.

In an alternative implementation, the first loss function may be a function for calculating a Euclidean distance between the position indicated by the position information of the corresponding business object and the preset standard position; and/or the second loss function may be a function for calculating a Euclidean distance between the confidence indicated by the confidence information of the corresponding business object and the preset standard confidence. With the approach of the Euclidean distance, it is simple to be implemented and may effectively indicate whether the convergence condition is met, but it is not limited hereto. Other approaches such as Mahalanobis distance, Bhattacharyya distance or the like are also applicable.

Alternatively, as previously mentioned, the preset standard position may be an average position obtained by averaging the positions of the business objects in the business object sample images to be trained, and/or the preset standard confidence may be an average confidence obtained by averaging the confidences of the business objects in the business object sample images to be trained.

Whether the information of the target user in the feature vector convolution result is converged may be determined by referring to relevant convergence condition using the convolution network model, which will not be described herein. If the information of the target user meets the convergence condition, the target user may be classified, and a category to which the target user belongs is specified, thus providing reference and basis for subsequent determination of the display position of the business object.

(4) If the convergence condition is met, the training on the convolution network model is finished; and if the convergence condition is not met, a parameter of the convolution network model is adjusted according to the feature vector convolution result, and the convolution network model is trained iteratively according to the adjusted parameter of the convolution network model until the iteratively trained feature vector convolution result meets the convergence condition.

Upon the above-mentioned training of the convolution network model, the convolution network model may perform feature extraction and classification on the display position of the business object based on the target user, thereby having a function of determining the display position of the business object in the video image. Here, when there are multiple display positions, the convolution network model may determine, upon the training with regard to the confidence of the business object, a preference order of the presentation effects of the multiple display positions, thereby determining an optimal display position (corresponding to a drawing position). In a subsequent application, when a business object needs to be presented, a valid display position may be determined based on the video image.

In addition, prior to the above-mentioned training of the convolution network model, the business object sample images may be pre-processed, including the following steps: acquiring a plurality of business object sample images, wherein each business object sample image contains tag information of the business object; determining whether a distance between a determined position of the business object and a preset position is less than or equal to a set threshold; and determining a business object sample image corresponding to a business object whose distance from the preset position is less than or equal to the set threshold as the business object sample image to be trained. Here, both the preset position and the set threshold may be appropriately set by those skilled in the art in any suitable manner. For example, they are set according to a data statistical analysis result, a relevant distance calculation formula, artificial experience and/or the like, which will not be limited in the embodiment of the present disclosure.

In an alternative mode, the position of the business object determined according to the tag information may be the center position of the business object. During the determination of the position of the business subject according to the tag information, and the determination of whether the distance between the determined position of the business object and the preset position is less than or equal to the set threshold value, the center position of the business object may be determined based on the tag information, and it is further determined whether a variance between the center position and the preset position is less than or equal to the set threshold. By pre-processing the business object sample images in advance, a sample image that does not meet a condition may be filtered out, thereby ensuring accuracy of a training result.

Training of the convolution network model is implemented with the above process, and the trained convolution network model may be used to determine the display position of the business object in the raw video image. For example, if a host clicks on a business object in a live broadcasting process to instruct displaying a business object, after the convolution network model acquires a facial feature point of the host in the live raw video image, an optimal position of the business object, for example, a forehead position of the host, may be indicated and the business object is further displayed at such a position. Alternatively, if a host clicks on a business object in a live broadcasting process to instruct displaying a business object, the convolution network model may determine a drawing position of the business object directly according to the live raw video image.

Approach Two

In approach two, a type of a target user is determined according to a feature point of the target user; drawing area information of a business object to be drawn is determined according to the type of the target user; and then a display position (equivalent to the drawing position) of the business object to be drawn in the video image is determined according to the drawing area information.

Here, the type of the target user includes, but not limited to, a face type, a background type, a hand type and an action type. Wherein the face type is used to indicate that a face occupies a major portion in a video image, the background type is used to indicate that the background occupies a major portion in the video image, the hand type is used to indicate that a hand occupies a major portion in the video image, and the action type is used to indicate that a person has made some kind of action.

Here, after the feature point of the target user is acquired, the type of the target user may be determined using a known relevant method for detection, classification or learning. After the type of the target user is determined, area information of the drawing position of the business object to be drawn may be determined according to a set rule, which includes the following approaches.

When the type of the target user is a face type, it is determined that the drawing area information of the business object to be drawn includes at least one of a hair area, a forehead area, a cheek area, a chin area, a body area other than a head of a person in the video image; and/or, When the type of the target user is a background type, it is determined that the drawing area information of the business object to be drawn includes a background area in the video image; and/or, When the type of the target user is a hand type, it is determined that the drawing area information of the business object to be drawn includes an area that is within a setting range in the video image and centered on an area where a hand is located; and/or, When the type of the target user is an action type, it is determined that the drawing area information of the business object to be drawn includes a preset area in the video image.

Here, the preset area in the video image may include any area other than a person in the video image. The preset area may be appropriately set by those skilled in the art according to actual situation, for example, an area within a setting range that is centered on an action generation part, or an area within the setting range other than the action generation part, or the background area, which is not limited in the embodiment of the present disclosure.

In an alternative implementation, the action corresponding to the action type includes at least one of blinking, opening mouth, nodding, shaking head, kissing, smiling, waving, making a "V" gesture, fisting, holding hand, thumbing up, making a "gun" gesture and making an "OK" gesture.

After the drawing area information is determined, the display position of the business object to be drawn in the video image may be further determined. For example, the business object is drawn by taking a center point of the drawing area information as a center point of the display position of the business object, and for another example, a coordinate position in the drawing area information is determined as a center point of the drawing position, which is not limited in the embodiment of the present disclosure. In the embodiment of the present disclosure, the preset area in the video image may include any area where the person is located in the video image or any area other than the person in the video image.

In the embodiment of the present disclosure, a target user terminal (such as a user terminal where a host is located) collects an action of a target user (such as a host) and background information when the target user is live broadcasting through an image acquisition device (such as a camera). A video image played on the target user terminal includes a raw video image and a first material drawn on the raw video image using computer graphics, and the raw video image, for example, is the action of the target user and the background when the target user is live broadcast. The video image may include, but not limited to, a video image in a live broadcast platform, or, of cause, a video image in a different platform, which is not limited in the present disclosure. The first material may include, but not limited to, a business object, such as a business object including a special effect with semantic information, or a business object including at least one of the following special effects containing advertisement information: a two-dimensional sticker effect, a three-dimensional effect and a particle effect, such as advertisements that are presented in the form of a sticker (that is an advertisement sticker), or special effects for presenting advertisements, such as 3d advertisement effects. Not limited by the above, other forms of business objects are also applicable to the business statistics schemes provided by the present disclosure, such as textual or introductory statements of an APP or other applications, or certain forms of objects (such as electronic pets) that interact with the video audience.

Material attribute information of the first material from the currently played video image as collected is acquired, wherein the material attribute information may include, but not limited to, identification information of the material, position information and link information of the material, such as an ID of the business object, a position of the business object and a link of the business object.

Step 204: the raw video image is encoded according to a set video encoding format and a transmission stream is generated according to the encoded raw video image and the material attribute information of the first material.

In an alternative example, step 204 may be performed by a processor by calling a corresponding instruction stored in a memory, or performed by a generating module 304 operated by the processor.

In an alternative example, before the target user terminal transmits video data to a plurality of other user terminals, it is necessary to determine, based on the transmission protocol, the encoding format set for the video image, and the raw video image is then encoded according to the set video encoding format, and a transmission stream is generated according to the material attribute information and the encoded raw video image.

The encoding format may include any video encoding format, such as H.264, H.265. If the raw video image is encoded according to the H.264 encoding format, the raw video image may be encoded by a VCL (Video Coding Layer), and the encoded raw video image is mapped to an NAL (Net Abstraction Layer), wherein the encoded raw video image is composed of a plurality of NAL units, each NAL unit includes an NAL header and a RBSP (Raw Byte Sequence Payload).

The NAL unit may include multiple types of data segments and importance indicators corresponding to each data segment, as shown in Table 1:

TABLE 1

| nal_unit_type (Type of NALU) | NAL type | nal_reference_bit (Polarity of NALU) |
|---|---|---|
| 0 | Unused | 0 |
| 1 | Non-IDR slice | Not equal to 0 if such a slice belongs to a reference frame, and equal to 0 if such a slice does not belong to a reference frame |
| 2 | Partition A of slice data | Ibid |
| 3 | Partition B of slice data | Ibid |
| 4 | Partition C of slice data | Ibid |
| 5 | Slice of an IDR image | 5 |
| 6 | Supplemental enhancement information (SEI) unit | 0 |
| 7 | Set of sequence parameters | Non-zero |
| 8 | Set of image parameters | Non-zero |
| 9 | Delimiter | 0 |
| 10 | End of sequence | 0 |
| 11 | End of code stream | 0 |
| 12 | Filling | 0 |
| 13 . . . 23 | Retained | 0 |
| 24 . . . 31 | Non-retained | 0 |

In an alternative solution of the embodiment of the present disclosure, a transmission stream to be transmitted is generated by carrying the material attribute information in a RBSP of an NAL unit. As an improvement, the material attribute information may also be carried in an SEI (supplemental enhancement information) unit of the RBSP in the embodiment of the present disclosure. In addition to that the material attribute information is carried in the SEI unit of the RBSP, the material attribute information may also be carried in a different unit of the RBSP. For example, the material attribute information is carried in the field 13 . . . 23 and the field 24 . . . 31 as shown in Table 1, which is not particularly limited in the present disclosure.

In another alternative solution of the embodiment of the present disclosure, the material attribute information may be encoded together with the raw video image to generate a transmission stream to be transmitted.

Step 206: the transmission stream is converted into json-format data, and the converted data is transmitted to at least one second device terminal.

In an alternative example, step 206 may be performed by a processor by calling a corresponding instruction stored in a memory, or performed by a sending module 306 operated by the processor.

The transmission stream is converted into json-format data, and the converted data is transmitted to at least one user terminal (a terminal of an aficionado).

A specific example of video data frame transmission may be as follows:

```
{
    "version": "1.0",
    "id": "xxxxxx",
    "w": 1280,
    "h": 720,
    "url": "http://xxxxxxxx.com/xxxx",
    "parts": [
        {
            "cheek": {
                "cur_frame": 2,
                "render_info": {
                    "mode": "polygon",
                    "z-order": 1,
                    "pos": {
                        "1": [
                            12,
                            23
                        ],
                        "2": [
                            40,
                            23
                        ],
                        "3": [
                            12,
                            100
                        ],
                        "4": [
                            40,
                            100
                        ]
                    }
                }
            }
        }
    ]
}
```

Here, "version" is the version information of the current json format, and its type is a string with a format of x.y, where x is a major version number and means that the current structure has a major adjustment. If the json structure changes fairly extensively, for example, in the case that many contents are added or modified, 1 is added to the major version number; and y is a minor version number, and means that the current structure has a minor modification, for example, in the case that a number of fields are added or deleted, 1 is added to the small version number.

"id" is a unique identifier of the material used by the current business object, and its type is int or string.

W is a width of the raw video, and its type is int.

h is a height of the raw video, and its type is int.

url (Uniform Resource Locator) is a url for downloading the business object, and its type is string.

"Parts" are sub-material information in the business object. Names of an array sub-material should be identical to those in a business object package, and each sub-material name is a key of a parts array element.

"cur_frame" is a number of a sequence frame of the current business object, and its type is int.

"mode" is a rendering mode with a type of string. For an existing polygon type, a rendering approach represents following connection order of the points in a subsequent pos: lower left→lower right→upper left; upper left→upper right-→lower right.

"z-order" is an order of the business object along the z-axis direction, and its type is int.

"pos" is all identifying points with keywords ranked in an auto-increment order of 1, 2, 3 . . . , and its value is a point array, for example [12,23].

With the above-mentioned instances, for a material (business object), an identification, link, position coordinate and all key points of the material as well as a sequence frame number corresponding to the material may be clearly analyzed. The material may be drawn quickly by analyzing the instance after the decoding, thereby largely reducing a problem that general drawing relies on an algorithm and a terminal configuration.

According to the embodiment of the present disclosure, material attribute information of a first material in a video image played on a first device terminal is acquired; the raw video image is encoded in accordance with a set video encoding format; a transmission stream is generated according to the raw video image and the material attribute information of the first material; the transmission stream is converted into json-format data; and the converted data is sent to at least one second device terminal. The transmission stream to be transmitted carries the material attribute information of the first material, thus enabling a second end, while displaying the raw video image, to determine a material in the raw video image according to the material attribute information so as to perform corresponding processing drawing, thereby effectively reducing the video image display burden on the second end.

It will be understood by those skilled in the art that the serial number of each step in the above-described method in the detailed description of embodiments of the present disclosure does not mean the execution order of such steps, and the execution order of each step should be defined by function and intrinsic logic, which shall not constitute any limitation to the implementation process of the detailed description of embodiments of the present disclosure.

Figure 3:
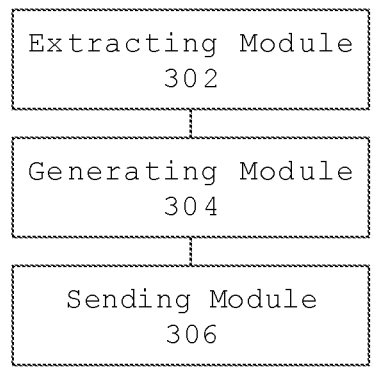
FIG. 3 is a structural diagram of a data processing apparatus according to the present disclosure.

FIG. 3 is a structural diagram of a data processing apparatus provided by the present disclosure, specifically comprising the following modules:

an extracting module 302, configured for acquiring material attribute information of a first material in a video image played on a first device terminal, wherein the video image includes a raw video image and the first material drawn on the raw video image using computer graphics;

a generating module 304, configured for generating a transmission stream according to the raw video image and the material attribute information; and a sending module 306, configured for sending the transmission stream to at least one second device terminal.

The data processing apparatus provided by the embodiments of the present disclosure may be used to realize each step of the data processing method according to the first embodiment, and has the corresponding effects of the method embodiments, which will not be repeated here.

Figure 4:
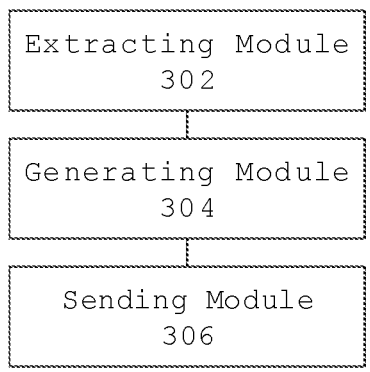
FIG. 4 is a structural diagram of a data processing apparatus according to the present disclosure.

FIG. 4 is a structural diagram of a data processing apparatus provided by the present disclosure, specifically comprising the following modules:

an extracting module 302, configured for acquiring material attribute information of a first material in a video image played on a first device terminal, wherein the video image includes a raw video image and the first material drawn on the raw video image using computer graphics;

a generating module 304, configured for encoding the raw video image according to a set video encoding format and generating a transmission stream according to the encoded raw video image and the material attribute information of the first material.

Here, the material attribute information includes at least one of the following: identification information of the material, position information or link information of the material.

The first material includes a business object, and the video image includes a video image in a live broadcast platform.

The business object comprises a special effect with semantic information. The business object comprises at least one of the following special effects containing advertising information: a two-dimensional sticker effect, a three-dimensional effect and a particle effect.

The generating module 304 is configured for encoding the raw video image according to a set video encoding format and generating a transmission stream according to the encoded raw video image and the material attribute information of the first material.

As an improvement, the generating module 304 is configured for encoding the raw video image according to the H.264 encoding format and carrying the material attribute information in a raw byte sequence payload (RBSP) of a network abstraction layer (NAL) unit to generate a transmission stream.

As an improvement, the generating module 304 is also configured for carrying the material attribute information in a supplemental enhancement information (SEI) unit in the RBSP.

Here, the transmission stream carries video attribute information of a video image currently played on a first device terminal.

The sending module 306 is configured for converting the transmission stream into json-format data, and transmitting the converted data to at least one second device terminal.

The data processing apparatus according to the embodiment of the present disclosure is used to implement the corresponding data processing method in the foregoing multiple method embodiments and has the beneficial effects of the corresponding method embodiments, which will not be repeated here.

Figure 5:
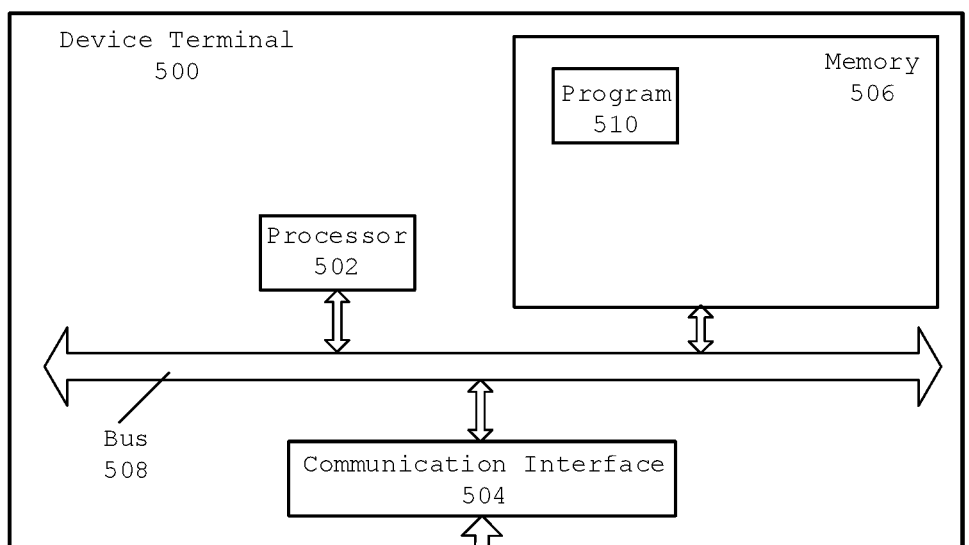
FIG. 5 is a structural diagram of an electronic device according to the present disclosure.

FIG. 5 is a structural diagram of an electronic device according to the embodiment of the present disclosure, and the specific implementation of the electronic device is not defined by such an embodiment. As shown in FIG. 5, the electronic device 500 may include:

A processor 502, a communication interface 504, a memory 506 and a communication bus 508, wherein:

The processor 502, the communication interface 504 and the memory 506 communicate with each other through the communication bus 508.

The communication interface 504 is configured for communicating between a server and a user terminal.

The processor 502 is configured for executing a program 510, and may be configured for specifically executing relevant steps in the method embodiments described above.

The present disclosure may take the form of a computer program product embodied in any tangible medium of expression having computer-usable program code embodied in the medium. Specifically, the program 510 may include a program code which includes computer operation instructions.

The processor 502 may be a central processing unit CPU or an application specific integrated circuit (ASIC) or is one or more integrated circuits configured to implement the embodiment of the present disclosure.

The memory 506 is configured for storing the program 510. The memory 506 may include a high-speed RAM memory, and may also include a non-volatile memory, such as at least one disk memory. The program 510 may specifically be used to cause the processor 502 to perform the following operations: acquiring material attribute information of a first material in a video image played on a first device terminal, wherein the video image includes a raw video image and the first material drawn on the raw video image using computer graphics; generating a transmission stream according to the raw video image and the material attribute information; and sending the transmission stream to at least one second device terminal.

In an alternative implementation, the program 510 is also used to cause the processor 502 to encode the raw video image in accordance with a set video encoding format and generate a transmission stream according to the encoded raw video image and the material attribute information of the first material.

In an alternative implementation, the program 510 is also used to cause the processor 502 to encode the raw video image in accordance with an H.264 encoding format and to carry the material attribute information in a RBSP in an encoded NAL unit to generate a transmission stream.

In an alternative implementation, the program 510 is also used to cause the processor 502 to carry the material attribute information in an SEI unit in the RBSP to generate a transmission stream.

In an alternative implementation, the program 510 is also used to cause the processor 502 to carry video attribute information of the raw video image in the transmission stream.

In an alternative implementation, the program 510 is also used to cause the processor 502 to convert the transmission stream into json-format data and send the converted data to at least one second device terminal.

In an alternative implementation, the program 510 is also used to cause the processor 502 to configure the material attribute information to include at least one of the following: identification information of the material, position information of the material, or link information of the material.

In an alternative implementation, the program 510 is also used to cause the processor 502 to configure the first material to include a business object, and configure the video image to include a video image in a live broadcast platform.

In an alternative implementation, the program 510 is also used to cause the processor 502 to configure a business object to include a special effect containing semantic information.

In an alternative implementation, the program 510 is also used to cause the processor 502 to configure the business object to include at least one of the following effects containing advertisement information: a two-dimensional sticker effect, a three-dimensional effect and a particle effect. The electronic device provided by the embodiment of the present disclosure may be used to realize each step of the data processing solution according to the first, second, third or fourth embodiment, and has the corresponding effects of method embodiments, which will not be repeated here.

Figure 6:
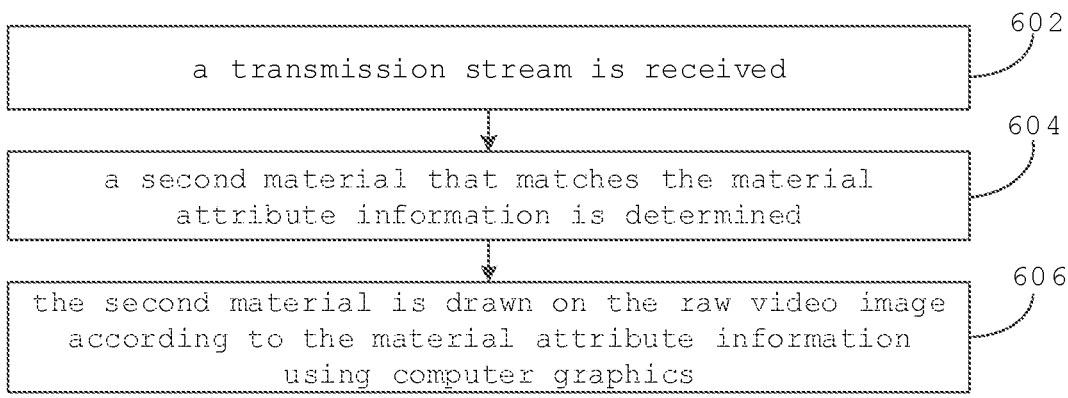
FIG. 6 is a step flowchart of a data processing method according to the present disclosure.

FIG. 6 is a step flowchart of a data processing method according to the embodiment of the present disclosure. The data processing method according to the present disclosure of the present disclosure will be described below with other user terminal (a second device terminal, such as a terminal of an aficionado) where the aficionado is located in a live broadcast scenario as an example. As shown in FIG. 6, the data processing method of the present embodiment specifically includes:

Step 602: a transmission stream is received.

In an alternative example, step 602 may be performed by a processor by calling a corresponding instruction stored in a memory, or performed by a receiving module 802 operated by the processor.

After a target user terminal (a first device terminal, such as a host terminal) establishes a video connection with one or more other user terminals (a second device terminal, such as a terminal of an aficionado), the target user terminal sends a transmission stream to the second user terminal in real time. The transmission stream may be a video image recorded by the target user terminal, wherein the transmission stream includes a raw video image and material attribute information.

Step 604: a second material that matches the material attribute information in the transmission stream is determined.

In an alternative example, step 604 may be performed by a processor by calling a corresponding instruction stored in a memory, or performed by a determining module 804 operated by the processor.

After the transmission stream is received, the transmission stream is decoded and the material attribute information is acquired from the decoded transmission stream, and a second material corresponding to the material attribute information is acquired from a material library by matching according to the material attribute information.

Step 606: the second material is drawn on the raw video image according to the material attribute information using computer graphics.

In an alternative example, step 606 may be performed by a processor by calling a corresponding instruction stored in a memory, or performed by a drawing module 806 operated by the processor.

The decoded transmission stream includes the raw video image and the material attribute information, wherein the raw video image may be a raw video image in the current live video images of the target user terminal (the first device terminal). After the decoding is completed, the raw video image is automatically displayed on other user terminal (a second device terminal), the second material in the material library is called according to the material attribute information, and the second material is drawn on the raw video image displayed on the other user terminal by means of computer graphics.

According to the embodiment of the present disclosure, by receiving the transmission stream, determining a second material that matches the material attribute information, and drawing the second material on the raw video image using computer graphics according to the material attribute information, the material may be quickly drawn according to the material attribute information without the need of complex algorithm analysis, thereby reducing data processing burden on one hand, and on the other hand, reducing requirements on a terminal configuration as a result of the absence of the need for an operation algorithm, realizing smooth watching of a live video effectively and enhancing the user experience.

Figure 7:
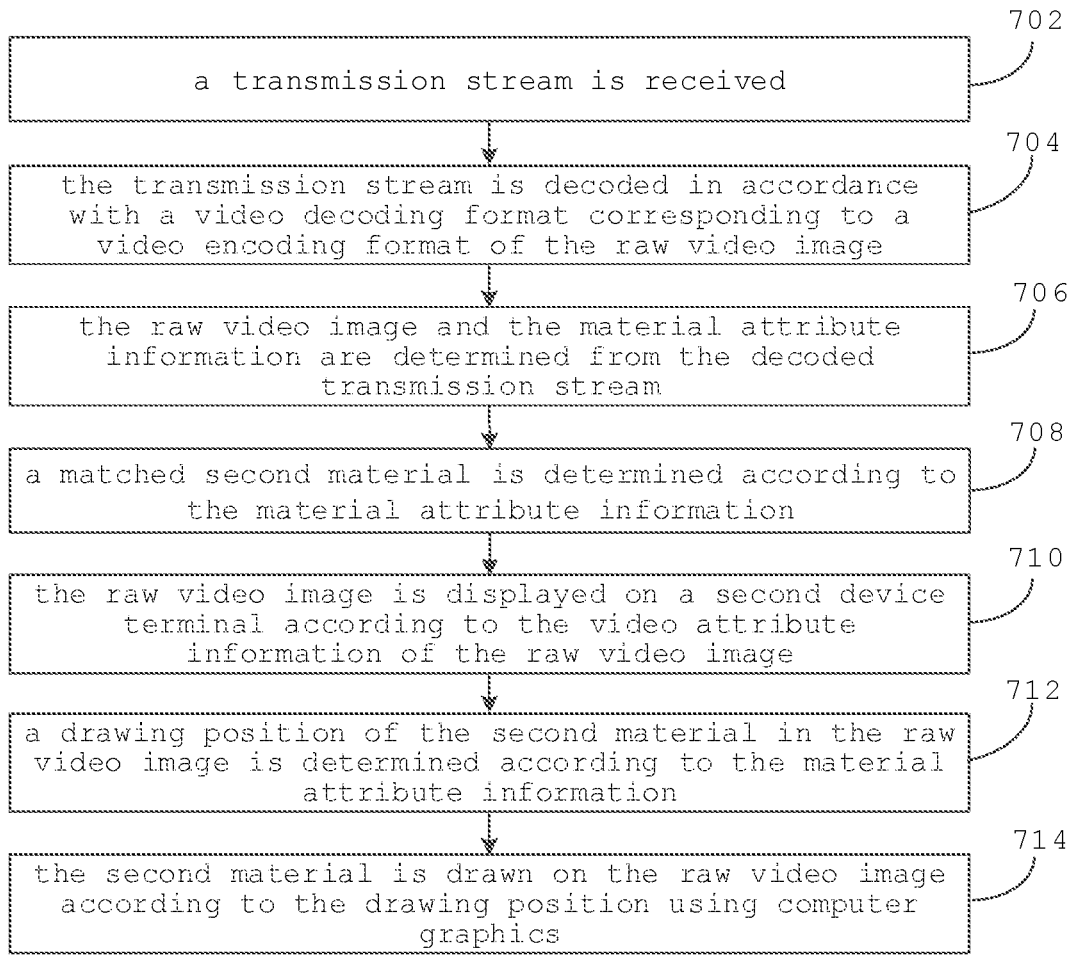
FIG. 7 is a step flowchart of a data processing method according to the present disclosure.

FIG. 7 is a step flowchart of a data processing method according to the embodiment of the present disclosure. The data processing method according to the embodiment of the present disclosure will be described below with another user terminal (a second device terminal) where an aficionado is located in a live broadcast scene as an example. As shown in FIG. 7, the data processing method according to the embodiment of the present disclosure specifically includes the following steps.

Step 702: a transmission stream is received.

In an alternative example, step 702 may be performed by a processor by calling a corresponding instruction stored in a memory, or performed by a receiving module 802 operated by the processor.

When a target user terminal (a first device terminal, such as a host terminal) is in a process of live broadcast, one or more other user terminals (a second device terminal, such as a terminal of an aficionado) will acquire the live broadcast of a current target user by accessing to a live broadcast room of the target user. The video data of the target user terminal and the user terminal are synchronous, that is, the target user terminal transmits a transmission stream to the user terminal in real time. The transmission stream is a video image recorded by the target user terminal, wherein the transmission stream includes a raw video image and material attribute information.

Step 704: the transmission stream is decoded in accordance with a video decoding format corresponding to a video encoding format of the raw video image.

In an alternative example, step 704 may be performed by a processor by calling a corresponding instruction stored in a memory, or performed by a decoding submodule 8042 in the determining module 804 operated by the processor.

After the video data frame is received, the transmission stream encoding format used by the target user terminal is determined. The encoding format is determined by the target user terminal, and the format may include any video encoding format, such as H.264, H.265. In the embodiment of the present disclosure, a uniform encoding/decoding format may be determined based on the transmission protocol. For example, when the video encoding format of the transmission stream is an H.264 encoding format, the transmission stream is decoded in accordance with the H.264 video decoding format.

Step 706: the raw video image and the material attribute information are determined from the decoded transmission stream.

In an alternative example, step 706 may be performed by a processor by calling a corresponding instruction stored in a memory, or performed by an information acquisition submodule 8044 in the determining module 804 operated by the processor.

In an alternative solution of the embodiment of the present disclosures, the transmission stream also carries the video attribute information of the raw video image, such as resolution information of a live video of the target user terminal. The raw video image, the material attribute information and the video attribute information are sequentially determined from the decoded transmission stream. In an alternative solution of the embodiment of the present disclosure, the material attribute information of the material may be obtained specifically from a RBSP in an NAL unit in the decoded transmission stream.

In an alternative example, the material attribute information may also be obtained from an SEI unit of the RBSP in the NAL unit in the decoded transmission stream.

In the embodiment of the present disclosure, the material attribute information of the material acquired from the encoded transmission stream may be determined according to the means used by the target user terminal for carrying the material attribute information in the transmission stream formed after the encoding target user terminal, which is not specifically limited in the present disclosure.

Step 708: a matched second material is determined according to the material attribute information.

In an alternative example, step 708 may be performed by a processor by calling a corresponding instruction stored in a memory, or performed by a matching submodule 8046 in the determining module 804 operated by the processor.

In the embodiment of the present disclosure, the material attribute information is determined from the decoded video data frame and the second material corresponding to the material attribute information is further determined, wherein the material attribute information includes at least one of the following: identification information of the material, position information of the material or link information of the material. The second material includes a business object, and the video image includes a video image in a live platform. The business object includes a special effect containing semantic information. For example, the business object includes at least one of the following special effects containing advertising information: a two-dimensional sticker effect, a three-dimensional effect and a particle effect. Not limited by the above, other forms of materials are also applicable to the data processing solution provided by the embodiment of the present disclosure, such as textual or introductory statements of APPs or other applications, or certain forms of objects (such as electronic pets) that interact with the video audience.

Step 710: the raw video image is displayed on a second device terminal according to the video attribute information of the raw video image.

In an alternative example, step 710 may be performed by a processor by calling a corresponding instruction stored in a memory, or performed by a display determining submodule 8062 in the drawing module 806 operated by the processor.

The raw video image is displayed on a second user terminal (a second device terminal) based on the determined video attribute information of the raw video image. For example, a resolution of the raw video image displayed on the second user terminal is determined according to a resolution of the raw video image.

Step 712: a drawing position of the second material in the raw video image is determined according to the material attribute information.

In an alternative example, step 710 may be performed by a processor by calling a corresponding instruction stored in a memory, or performed by a position determining submodule 8064 in the drawing module 806 operated by the processor.

The drawing position information and material link information corresponding to the second material are determined according to the material attribute information. For example, the drawing position of the second material in the raw video image is determined according to the material position information in the material attribute information.

Step 714: the second material is drawn on the raw video image according to the drawing position using computer graphics.

In an alternative example, step 714 may be performed by a processor by calling a corresponding instruction stored in a memory, or performed by a material drawing submodule 8066 in the drawing module 806 operated by the processor.

To draw the second material in a display interface of the second user terminal according to the material position information, an information presentation object may be drawn using computer graphics specifically, such as a proper graphic image drawing or rendering mode, including, but not limited to, drawing based on an OpenGL graphics drawing engine. OpenGL defines a professional graphics program interface with cross-programming-language, cross-platform programming interface specifications, and the interface is hardware-independent and may be used to easily draw a 2D or 3D graphic image. OpenGL not only may be used to draw a 2D effect such as a 2D sticker, but may also be used to draw a 3D effect and a particle effect.

After the second material is drawn, corresponding link information is added to the second material according to the link information of the material in the material attribute so that a user from a second user terminal enters an interface corresponding to the link information by clicking on the second material, such as a Taobao shop, or an official website of the second material.

According to the embodiment of the present disclosure, a transmission stream is received; the transmission stream is decoded in accordance with a video decoding format corresponding to a video encoding format of the raw video image; the raw video image and the material attribute information are determined from the decoded transmission stream; a matched second material is determined according to the material attribute information; the raw video image is displayed on a second device terminal according to the video attribute information of the raw video image; a drawing position of the second material in the raw video image is determined according to the material attribute information; and the second material is drawn on the raw video image according to the drawing position using computer graphics. The material may be quickly drawn according to the material attribute information without the need for complex algorithm analysis, which, on the one hand, reduces the data processing burden, and, on the other hand, reduces the requirements for a terminal configuration because of the absence of need for an operation algorithm, thereby effectively achieving the smooth watching of a live video. Meanwhile, a user may click on the material to jump to a link page corresponding to the material, which is convenient for the user to further understand, thereby enhancing the user experience.

It will be understood by those skilled in the art that the serial number of each step in the above-described method in the detailed description of embodiments of the present disclosure does not mean the execution order of such steps, and the execution order of each step should be defined by function and intrinsic logic, which shall not constitute any limitation to the implementation process of the detailed description of embodiments of the present disclosure.

Figure 8:
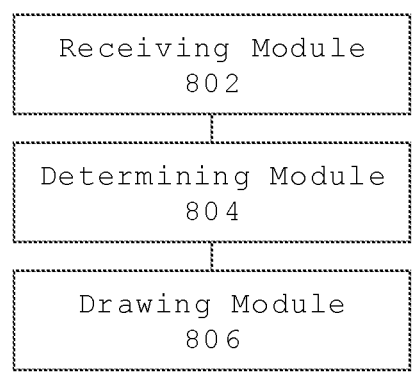
FIG. 8 is a structural diagram of a data processing apparatus according to the present disclosure.

FIG. 8 is a structural diagram of a data processing apparatus provided by the present disclosure, the apparatus specifically comprising the following modules:

a receiving module 802, configured for receiving a transmission stream, the transmission stream including a raw video image and material attribute information.

a determining module 804, configured for determining a second material that matches the material attribute information; and a drawing module 806, configured for drawing the second material on the raw video image according to the material attribute information using computer graphics.

The data processing apparatus provided by the embodiment of the present disclosure is used to implement the corresponding data processing method in the foregoing method embodiments and has the beneficial effects of the corresponding method embodiments, which will be repeated here.

Figure 9:
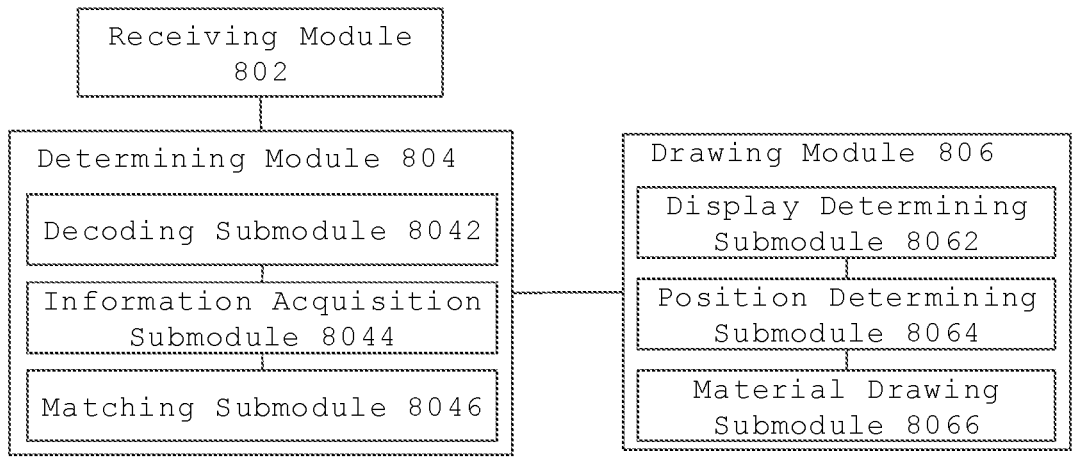
FIG. 9 is a structural diagram of a data processing apparatus according to the present disclosure.

FIG. 9 is a structural diagram of a data processing apparatus provided by the embodiment of the present disclosure, the apparatus specifically comprising the following modules:

A receiving module 802, configured for receiving a transmission stream, the transmission stream including a raw video image and material attribute information.

A determining module 804 that comprises: a decoding submodule 8042, configured for decoding the transmission stream in accordance with a video decoding format corresponding to a video encoding format of the raw video image; an information acquisition submodule 8044, configured for determining the raw video image and the material attribute information from the decoded transmission stream; and a matching submodule 8046, configured for determining a matched second material according to the material attribute information.

As an improvement, the decoding submodule 8042 is configured for decoding the transmission stream in accordance with an H.264 video decoding format when the video encoding format of the raw video image is an H.264 encoding format, wherein the transmission stream further carries video attribute information of the raw video.

As an improvement, the decoding submodule 8042 is configured for determining a raw video image from the decoded transmission stream; determining material attribute information from a raw byte sequence payload (RBSP) in a network abstraction layer (NAL) unit; and determining video attribute information of the raw video from the decoded transmission stream.

As an improvement, the decoding submodule 8042 is configured for determining material attribute information from a supplemental enhancement information (SEI) unit in the RBSP.

A drawing module 806 that comprises: a display submodule 8062, configured for displaying the raw video image on a second device terminal according to the video attribute information of the raw video; a position determining submodule 8064, configured for determining a drawing position of the second material in the raw video image according to the material attribute information; and a material drawing submodule 8066, configured for drawing the second material on the raw video image according to the drawing position using computer graphics. Here, the material attribute information includes at least one of the following: identification information of the material, position information of the material or link information of the material. The second material includes a business object, and the raw video image includes a video image in a live broadcast platform. The business object comprises a special effect with semantic information. The business object comprises at least one of the following special effects containing advertising information: a two-dimensional sticker effect, a three-dimensional effect and a particle effect.

The data processing apparatus according to the embodiment of the present disclosure is used to implement the corresponding data processing method in the foregoing multiple method embodiments and has the beneficial effects of the corresponding method embodiments, which will not be repeated here.

Figure 10:
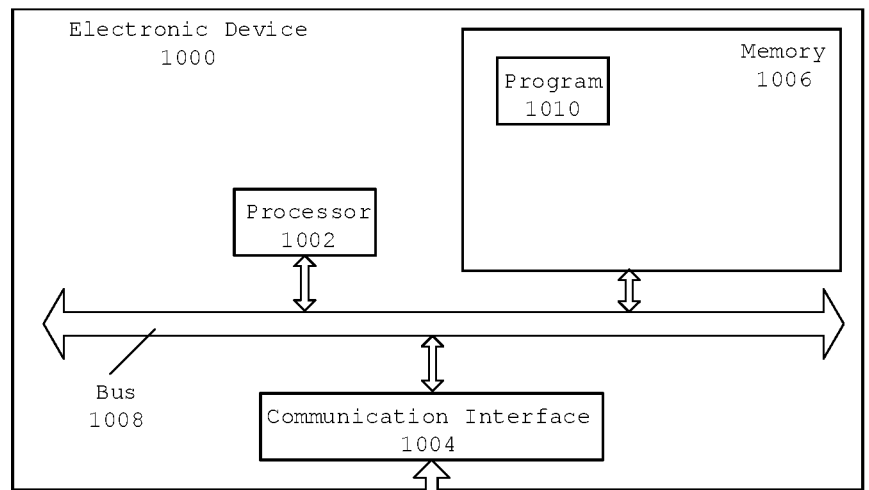
FIG. 10 is a structural diagram of an electronic device according to the present disclosure.

FIG. 10 is a structural diagram of an electronic device according to the present embodiment of the present invention, and the specific embodiment of the present disclosure does not limit the specific implementation of the electronic device.

As shown in FIG. 10, the electronic device 1000 may include a processor 1002, a communication interface 1004, a memory 1006 and a communication bus 1008, wherein:

The processor 1002, the communication interface 1004 and the memory 1006 communicate with each other through the communication bus 1008.

The communication interface 1004 is configured for communication between a server and a user terminal.

The processor 1002 is configured for executing a program 1010, and may be configured for specifically executing relevant steps in the method embodiments described above.

In particular, the program 1010 may include a program code which includes a computer operation instruction.

The processor 1002 may be a central processing unit CPU or an application specific integrated circuit (ASIC) or is one or more integrated circuits configured to implement the embodiment of the present disclosure.

The memory 1006 is configured for storing the program 1010. The memory 1006 may include a high-speed RAM memory, and may also include a non-volatile memory, such as at least one disk memory. As will be appreciated by one skilled in the art, the present disclosure may be embodied as a computer program product. Accordingly, the present disclosure may take the form of an entirely hardware embodiment, an entirely software embodiment (including firmware, resident software, micro-code, etc.) or an embodiment combining software and hardware. Furthermore, the present disclosure may take the form of a computer program product embodied in any tangible medium of expression having computer-usable program 1010 embodied in the medium. The program 1010 may be used to cause the processor 1002 to receive a transmission stream, the transmission stream including a raw video image and material attribute information; determine a second material that matches the material attribute information in the transmission stream; and draw the second material on the raw video image according to the material attribute information using computer graphics.

In an alternative implementation, the program 1010 is also used to cause the processor 1002 to decode the transmission stream in accordance with a video decoding format corresponding to a video encoding format of the raw video image; determine the raw video image and the material attribute information from the decoded transmission stream; and determine a matched second material according to the material attribute information.

In an alternative implementation, the program 1010 is also used to cause the processor 100 to decode the transmission stream in accordance with an H.264 video decoding format when the video encoding format of the raw video image is the H.264 encoding format.

In an alternative implementation, the program 1010 is also used to cause the processor 1002 to further carry the video attribute information of the raw video in the transmission stream, and determine the raw video image from the decoded transmission stream; determine the material attribute information from a RBSP in an NAL unit; and determine the video attribute information of the raw video image from the decoded transmission stream.

In an alternative implementation, the program 1010 is also used to cause the processor 1002 to acquire the material attribute information from an SEI unit in the RBSP.

In an alternative implementation, the program 1010 is also used to cause the processor 1002 to display the raw video image on a second device terminal according to the video attribute information of the raw video image; determine a drawing position of the second material in the raw video image according to the material attribute information; and draw the second material on the raw video image according to the drawing position using computer graphics.

In an alternative implementation, the program 1010 is also used to cause the processor 1002 to configure the material attribute information to include at least one of the following: identification information of the material, position information of the material and link information of the material.

In an alternative implementation, the program 1010 is further configured for causing the processor 1002 to configure the second material to include a business object, and configure the raw video image to include a video image in a live broadcast platform.

In an alternative implementation, the program 1010 is further configured for causing the processor 1002 to configure the second material to include a business object, and configure the raw video image to include a video image in a live broadcast platform.

In an alternative implementation, the program 1010 is also used to cause the processor 1002 to configure the business object to include at least one of the following effects containing advertisement information: a two-dimensional sticker effect, a three-dimensional effect and a particle effect.

The electronic device according to the embodiment of the present disclosure may be used to realize each step of the data processing solution according to the sixth, seventh, eighth or ninth embodiment, and has the corresponding effects of method embodiments, which will not be repeated here. It should be noted that the various components/steps described in the embodiment of the present disclosure may be split into more components/steps depending on the needs of the implementation, and two or more components/steps or some operations of the component/step may be combined into a new component/step to achieve the purpose of the embodiment of the present disclosure.

The above-described method according to the embodiment of the present disclosure may be implemented in hardware or firmware, or may be implemented as a software or computer code that may be stored in a recording medium such as CD ROM, RAM, floppy disk, hard disk or magneto-optical disk, or as a web downloaded computer code that is originally stored in a remote recording medium or a non-temporary machine-readable medium and will be stored in a local recording medium, so that the method described herein may be processed by such a software that is stored in a recording medium using a general purpose computer, dedicated processor or a programmable or dedicated software (such as ASIC or FPGA). It will be understood that a computer, processor, microprocessor controller or programmable hardware includes a storage component (such as RAM, ROM, flash memory) that may store or receive a software or computer code. When the software or computer code is accessed and executed by the computer, processor or hardware, the processing method as described is implemented. In addition, when the general purpose computer accesses a code for implementing the processing shown here, the execution of the code converts the general purpose computer to a dedicated computer for performing the processing shown here.

Figure 11:
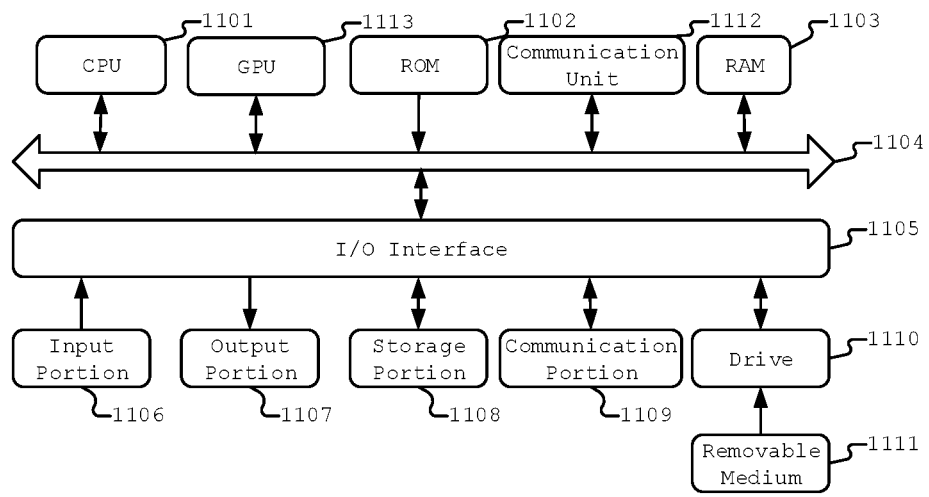
FIG. 11 is a structural diagram of an electronic device according to the present disclosure.

FIG. 11 is a structural diagram of a different embodiment of an electronic device according to the present disclosure. FIG. 11 is a structural diagram of an electronic device suitable for an electronic device or a server for implementing the embodiment of the present disclosure. As shown in FIG. 11, the electronic device includes one or more processors and communication units. The one or more processors, for example, are one or more central processing units (CPUs) 1101 and/or one or more image processors (GPUs) 1113. The processor may perform various proper actions and processing according to an executable instruction stored in a read only memory (ROM) 1102 or an executable instruction loaded into a random access memory (RAM) 1103 from a storage portion 1108. The communication unit 1112 may include, but not limited to, a network card that may include, but not limited to, an IB (Infiniband) network card. The processor may communicate with the read-only memory 1102 and/or the random access memory 1103 to execute the executable instructions, and is connected with the communication unit 1112 through a bus 1104 and communicates with a second target device via the communication unit 1112 so as to complete the operation corresponding to any one of the data processing methods as provided by the embodiment of the present disclosure, such as: acquiring material attribute information of a first material in a video image played on a first device terminal, wherein the video image includes a raw video image and the first material drawn on the raw video image using computer graphics; generating a transmission stream according to the raw video image and the material attribute information; and sending the transmission stream to at least one second device terminal.

In addition, various programs and data necessary for operation by the apparatus may also be stored in the RAM 1103. The CPU 1101, ROM 1102 and RAM 1103 are connected to each other through the bus 1104. In the case that there is a RAM 1103, the ROM 1102 is an optional module. The RAM 1103 stores an executable instruction or an executable instruction is written into the ROM 1102 at runtime, and the executable instruction causes the processor 1101 to perform the operation corresponding to the above-described method for displaying a business object in a video image. An input/output (I/O) interface 1105 is also connected to the bus 1104. The communication unit 1112 may be integrated, or may be configured to having a plurality of submodules (for example, a plurality of IB network cards) and to be located on a bus link.

The following components are connected to the I/O interface 1105: an input portion 1106 including a keyboard and a mouse; an output portion 1107 including a cathode ray tube (CRT), a liquid crystal display (LCD) and a loudspeaker; a storage portion 1108 including a hard disk; and a communication portion 1109 including a network interface card such as a LAN card and a modem.

The communication portion 1109 performs communication through a network such as the Internet. A drive 1110 is also connected to the I/O interface 1105 as needed.

A removable medium 1111, such as a magnetic disk, an optical disk, a magneto-optical disk and a semiconductor memory, is mounted on the drive 1110 as needed so that a computer program read therefrom is installed into the storage portion 1108 as needed.

It should be noted that the architecture as shown in FIG. 11 is only an alternative implementation, and that the number and type of components shown in FIG. 11 may be selected, deleted, added or increased or the components may be replaced in accordance with the actual needs in the specific practice. For the setting of components with different functions, such an implementation mode as separate setting or integrated setting may be used. For example, the GPU 1113 and the CPU 1101 may be set separately or the GPU 1113 may be integrated in the CPU 1101, and the communication unit 1112 may be set separately or may be integrated in the CPU 1101 or the GPU 1113. Such alternative embodiments fall within the protection scope of the present disclosure.

It should be noted that the various components/steps described in the embodiment of the present disclosure may be split into more components/steps depending on the needs of the implementation, and two or more components/steps or some operations of the component/step may be combined into a new component/step to achieve the purpose of the embodiment of the present disclosure. Those skilled in the art may appreciate that the methods and apparatus according to the present disclosure may be implemented in many ways. For example, the methods and apparatus according to the present disclosure may be implemented by software, hardware, firmware, or any combination of the software, hardware and firmware. The execution of such functions with hardware or software depends on the specific application and design constraints of the technical solution. A professional may use different methods to implement the described functions for each particular application, but such an implementation should not be considered beyond the scope of the embodiment of the present disclosure.

The sequence of the steps for the method is for the sake of illustration only and the steps of the method according to the present disclosure are not limited to the sequences described above in detail, unless otherwise specifically stated. In addition, in some embodiments, the present disclosure may also be implemented as a program as recorded in a recording medium, and the program includes a machine-readable instruction for implementing the method according to the present disclosure. Therefore, the present disclosure also covers a recording medium storing a program for executing the method according to the present disclosure.

Those skilled in the art may appreciate that the units and method steps of each example described in connection with the embodiments disclosed in the present disclosure may be implemented with electronic hardware or a combination of computer software and electronic hardware. The execution of such functions with hardware or software depends on the specific application and design constraints of the technical solution. A professional may use different methods to implement the described functions for each particular application, but such an implementation should not be considered beyond the scope of the embodiment of the present disclosure.

The implementations above are merely illustrative of the embodiments of present disclosure and are not intended to limit the embodiments of the present disclosure. Those skilled in the art may make various changes and modifications without departing from the scope of the embodiments of the present disclosure. Therefore, all equivalent technical solutions are within the scope of the embodiments of the present disclosure, and the scope of embodiments of the present disclosure is limited by the claims.

What is claimed is:

1. A data processing method, comprising:
   acquiring material attribute information of a first material in a video image played on a first device terminal, wherein the video image comprises a raw video image captured by the first device terminal and the first material drawn on the raw video image using computer graphics;
   generating a transmission stream according to the raw video image and the material attribute information; and
   sending the transmission stream to at least one second device terminal,
   wherein the material attribute information comprises a drawing position of the first material to be drawn in the video image, and the drawing position is selected by the first device terminal based on a feature point of a target object that is determined from the raw video image.

2. The method according to claim 1, wherein the generating a transmission stream according to the raw video image and the material attribute information comprises:

encoding the raw video image according to a set video encoding format, and generating a transmission stream according to the encoded raw video image and the material attribute information of the first material.

3. The method according to claim 1, wherein the material attribute information further comprises at least one of the following: identification information of the first material and link information of the first material.

4. A non-transitory computer readable medium, storing a computer program thereon, the program, when executed by a processor, causes the processor to perform the data processing method according to claim 1.

5. The method according to claim 1, wherein the first material comprises one of a special effect with semantic information, a business object with a special effect containing advertisement information, and an object interacting with video audience.

6. The method according to claim 1, wherein the determination of the drawing position according to the feature point of the target object comprises:
determining a type of the target object according to the feature point; and
determining the drawing position according to the type of the target object.

7. A data processing method, comprising:
receiving, by a second device terminal, a transmission stream from a first device terminal, the transmission stream comprising a raw video image captured by the first device terminal and material attribute information;
determining a second material that matches the material attribute information in the transmission stream; and
drawing the second material on the raw video image according to the material attribute information using computer graphics,
wherein the material attribute information comprises a drawing position of the second material to be drawn in the raw video image, and the drawing position is selected by the first device based on a feature point of a target object that is determined from the raw video image.

8. The method according to claim 7, wherein the determining a second material that matches the material attribute information in the transmission stream comprises:
decoding the transmission stream in accordance with a video decoding format corresponding to a video encoding format of the raw video image;
determining the raw video image and the material attribute information from the decoded transmission stream; and
determining a matched second material according to the material attribute information.

9. The method according to claim 8, wherein the transmission stream further carries video attribute information of the raw video image; and
the determining the raw video image and the material attribute information from the decoded transmission stream comprises:
determining the raw video image from the decoded transmission strea.
determining the material attribute information from a raw byte sequence payload (RBSP) of a network abstraction layer (NAL) unit; and
determining video attribute information of the raw video image from the decoded transmission stream.

10. The method according to claim 9, wherein the determining the material attribute information from a raw byte sequence payload (RBSP) in a network abstraction layer (NAL) unit comprises:
determining the material attribute information from a supplemental enhancement information (SEI) unit of the RBSP.

11. The method according to claim 7, wherein the drawing the second material on the raw video image according to the material attribute information using computer graphics comprises:
displaying the raw video image on a second device terminal according to the video attribute information of the raw video image;
determining a drawing position of the second material in the raw video image according to the material attribute information; and
drawing the second material on the raw video image according to the drawing position using computer graphics.

12. The method according to claim 7, wherein the material attribute information further comprises at least one of the following: identification information of the first material and link information of the first material.

13. A non-transitory computer readable medium, storing a computer program thereon, the program, when executed by a processor, causes the processor to perform the data processing method according to claim 6.

14. A data processing apparatus, comprising:
a processor;
an image acquisition device; and
instructions to cause the processor to perform operations, the operations comprising:
acquiring material attribute information of a first material in a video image played on a first device terminal, wherein the video image comprises a raw video image captured by the image acquisition device and the first material drawn on the raw video image using computer graphics;
generating a transmission stream according to the raw video image and the material attribute information; and
sending the transmission stream to at least one second device terminal,
wherein the material attribute information comprises a drawing position of the first material to be drawn in the video image, and the drawing position is selected by the processor based on a feature point of a target object that is determined from the video image.

15. The apparatus according to claim 14, wherein the generating a transmission stream according to the raw video image and the material attribute information comprises:
encoding the raw video image according to a set video encoding format and generating a transmission stream according to the encoded raw video image and the material attribute information of the first material.

16. The apparatus according to claim 15, wherein the encoding the raw video image according to a set video encoding format and generating a transmission stream according to the encoded raw video image and the material attribute information of the first material comprises:
encoding the raw video image according to an H.264 encoding format; and carrying the material attribute information in an encoded raw byte sequence payload (RBSP) of a network abstraction layer (NAL) unit to generate a transmission stream.

17. The apparatus according to claim 16, wherein the operations further comprise:

carrying the material attribute information in a supplemental enhancement information (SEI) unit of the RBSP to generate a transmission stream.

18. A data processing apparatus, comprising:
a processor; and
instructions to cause the processor to perform operations, the operations comprising:
receiving a transmission stream, the transmission stream comprising a raw video image captured by another data processing apparatus and material attribute information;
determining a second material that matches the material attribute information in the transmission stream; and
drawing the second material on the raw video image according to the material attribute information using computer graphics,
wherein the material attribute information comprises a drawing position of the second material to be drawn in the raw video image, and the drawing position is selected by the another data processing apparatus based on a feature point of a target object that is determined from the video image.

19. The apparatus according to claim 18, wherein the determining a second material that matches the material attribute information in the transmission stream comprises:

decoding the transmission stream in accordance with a video decoding format corresponding to a video encoding format of the raw video image;
determining the raw video image and the material attribute information from the decoded transmission stream; and
determining a matched second material according to the material attribute information.

20. The apparatus according to claim 18, wherein the drawing the second material on the raw video image according to the material attribute information using computer graphics comprises:
displaying the raw video image on a second device terminal accordingo the video attribute information of the raw video image;
determining a drawing position of the second material in the raw video image according to the material attribute information; and
drawing the second material on the raw video image according to the drawing position using computer graphics.

* * * * *